(12) United States Patent
Cruz et al.

(10) Patent No.: US 7,633,894 B2
(45) Date of Patent: Dec. 15, 2009

(54) SCHEDULING METHODS FOR WIRELESS NETWORKS

(75) Inventors: Rene L. Cruz, La Jolla, CA (US); Arvind V. Santhanam, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 716 days.

(21) Appl. No.: 10/525,696

(22) PCT Filed: Sep. 5, 2003

(86) PCT No.: PCT/US03/28076

§ 371 (c)(1),
(2), (4) Date: Aug. 4, 2005

(87) PCT Pub. No.: WO2004/023668

PCT Pub. Date: Mar. 18, 2004

(65) Prior Publication Data

US 2006/0046658 A1    Mar. 2, 2006

Related U.S. Application Data

(60) Provisional application No. 60/408,379, filed on Sep. 5, 2002.

(51) Int. Cl.
*H04B 7/185* (2006.01)
*H04B 7/00* (2006.01)
(52) U.S. Cl. ..................... 370/318; 455/522
(58) Field of Classification Search .......... 370/318; 455/522
See application file for complete search history.

(56) References Cited

U.S. PATENT DOCUMENTS

| 5,450,395 | A | * | 9/1995 | Hostetter et al. ............ 370/320 |
|---|---|---|---|---|
| 5,621,723 | A | * | 4/1997 | Walton et al. ............... 370/335 |
| 6,067,446 | A | * | 5/2000 | Persson et al. ................ 455/69 |
| 6,085,107 | A | * | 7/2000 | Persson et al. .............. 455/522 |
| 6,987,778 | B2 | * | 1/2006 | Sindhushayana et al. .... 370/468 |
| 7,020,147 | B1 | * | 3/2006 | Amadon et al. ............. 370/401 |
| 7,139,323 | B2 | * | 11/2006 | Erving et al. ............... 375/260 |
| 7,286,489 | B2 | * | 10/2007 | Ades .......................... 370/254 |
| 7,558,255 | B2 | * | 7/2009 | Vasudevan .................. 370/355 |
| 2002/0049561 | A1 | * | 4/2002 | Garcia-Luna-Aceves et al. ......................... 702/182 |
| 2002/0051425 | A1 | | 5/2002 | Larsson |
| 2002/0193133 | A1 | | 12/2002 | Shibutani |
| 2003/0095504 | A1 | * | 5/2003 | Ogier ......................... 370/235 |
| 2003/0100343 | A1 | * | 5/2003 | Zourntos et al. ............ 455/562 |
| 2003/0120809 | A1 | * | 6/2003 | Bellur et al. ................ 709/239 |
| 2003/0157900 | A1 | | 8/2003 | Gaal et al. |
| 2003/0161268 | A1 | * | 8/2003 | Larsson et al. .............. 370/229 |
| 2003/0202491 | A1 | | 10/2003 | Tiedemann, Jr. et al. |

(Continued)

*Primary Examiner*—Rafael Pérez-Gutiérrez
*Assistant Examiner*—Allahyar Kasraian
(74) *Attorney, Agent, or Firm*—Greer, Burns & Crain, Ltd.

(57) ABSTRACT

The invention concerns routing, scheduling, and power control methods for single and multi-hop wireless networks. A multi-hop network is one in which source and destination nodes may communicate directly or through relay nodes. Nodes in single hop networks communicate without use of relay nodes. Embodiments of the invention may produce an optimal schedule to provide for the best-case goal for a given parameter. In a preferred embodiment, total power is the parameter and total power is minimized for the network. In another preferred embodiment, data throughput is the parameter, and throughput is maximized for the network.

15 Claims, 11 Drawing Sheets

U.S. PATENT DOCUMENTS

| | | |
|---|---|---|
| 2003/0204615 A1 | 10/2003 | Wei et al. |
| 2004/0013101 A1* | 1/2004 | Akin et al. .................. 370/342 |
| 2004/0038697 A1* | 2/2004 | Attar et al. .................. 455/522 |
| 2004/0095907 A1* | 5/2004 | Agee et al. .................. 370/334 |
| 2004/0202196 A1* | 10/2004 | Sindhushayana et al. .... 370/465 |
| 2005/0032541 A1* | 2/2005 | Wang et al. .................. 455/522 |
| 2007/0201393 A1* | 8/2007 | Srikrishna et al. ........... 370/318 |
| 2008/0075033 A1* | 3/2008 | Shattil ........................ 370/328 |

* cited by examiner

SCHEDULING METHODS FOR WIRELESS NETWORKS

PRIORITY CLAIM

Applicants claim priority benefits under 35 U.S.C. § 119 on the basis of Patent Application No. 60/408,379; filed Sep. 5, 2002.

STATEMENT OF GOVERNMENT INTEREST

This invention was made with Government assistance under NSF Grant No. NSF 0123421. The Government has certain rights in this invention.

TECHNICAL FIELD

The field of the invention is wireless communications. The invention is particularly concerned with wireless networks, including single hop and multi-hop networks.

BACKGROUND ART

Using wireless radio frequency transmissions provides great freedom to configure networks. Wireless models become more popular because inconvenience and expenses associated with physical connectivity, i.e., through wires, are eliminated. The wireless model is also generally more flexible in that the potential paths for communications are not constrained by any wired connection.

Limitations in the wireless communication model for networks include signal interference and power limitations, which both constrain data capacity. Signal interference is the natural interference inherent in wireless communications. Power limitations arise from communication standards, e.g., the Federal Communication Commission standards in the United States, that limit the power that transmitters may use for a transmission. Power limitations also arise from the portable power sources sometimes used by nodes in wireless networks.

Power and data rate constraints have been addressed on a node to node level, but an efficient and systematic method for accounting for these constraints on a network wide basis is believed lacking. Yet, even modest efforts at centralized scheduling in networks have made significant contributions to increase network capacity. In the conventional IEEE 802.11 standard there is a point coordinate function to centralize scheduling of users in a network. The HDR (1EX VDO) standard also schedules transmissions centrally on downlink channels. There remains a need, however, for a systematic approach that is effective and computationally feasible.

DISCLOSURE OF THE INVENTION

The invention concerns routing, scheduling, and power control methods for single and multi-hop wireless networks. A multi-hop network is one in which source and destination nodes may communicate directly or through relay nodes. Nodes in single hop networks communicate without use of relay nodes. Embodiments of the invention may produce an optimal schedule to provide for the best-case goal for a given parameter. In a preferred embodiment, total power is the parameter and total power is minimized for the network. In another preferred embodiment, data throughput is the parameter, and throughput is maximized for the network.

BEST MODE OF CARRYING OUT THE INVENTION

Figure 1:
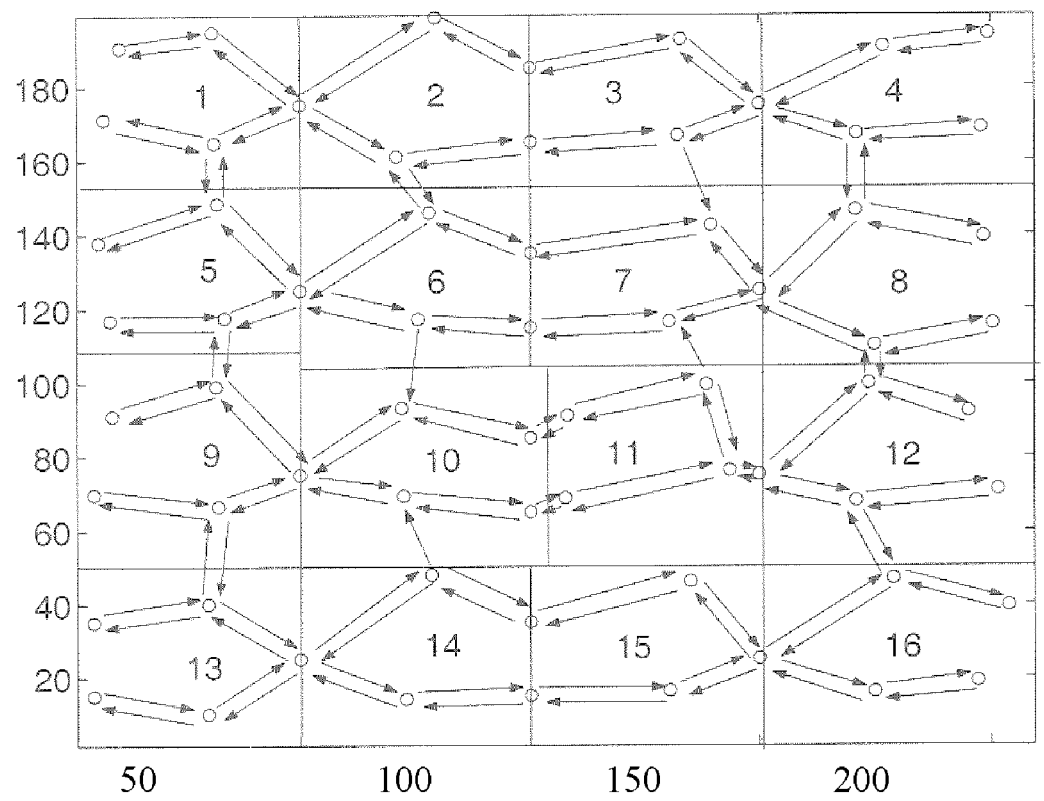
FIG. 1. is an exemplary network topology for application of methods of the invention and used in a numerical simulation of an embodiment of the invention.

The invention concerns routing, scheduling, and power control methods for single and multi-hop wireless networks. A multi-hop network is one in which source and destination nodes may communicate directly or through relay nodes. Nodes in single hop networks communicate without use of relay nodes. Embodiments of the invention may produce an optimal schedule to provide for the best-case goal for a given parameter. In a preferred embodiment, total power is the parameter and total power is minimized for the network. In another preferred embodiment, data throughput is the parameter, and throughput is maximized for the network.

Embodiments of the invention also provide an integrated routing, link scheduling and power allocation policy for a general multi-hop network that minimizes the total average power consumption to support minimum average rate requirements per link. Multi-hop networks implementing methods of the invention can support higher throughputs than with conventional approaches to radio resource allocation. Methods of the invention may be implemented in multi-hop networks that are time synchronized between transmitters, and are characterized by channel conditions that remain essentially constant over several time slots.

Methods of the invention are generally applicable to single and multi-hop networks, but will not perform as efficiently in networks with rapidly changing channel conditions. The invention is particularly well-suited for application to networks of wireless nodes in a small geographical area, such as a WI-FI network, or an IEEE 802.11 style network.

According to another aspect of the invention, large-scale networks are also handled. For large-scale networks, a hierarchical approach is applied whereby the set of links is partitioned into clusters. The links in each cluster are scheduled somewhat independently from the links in other clusters, and intercluster interference is modeled as static ambient noise. Interaction between clusters is modeled with a fixed-point equation, which determines the level of inter-cluster interference. At a higher level, scheduling can be done at the cluster level, rather than at the link level.

For embodiments that minimize total power, we find our optimal power control policies are such that each node is either transmitting at peak power to a single receiver or not transmitting at all, which makes it simpler to implement from the standpoint of computational resources and speed. This also means that nodes can go to sleep much of the time, when they are not transmitting or receiving, potentially conserving a great deal of energy. The optimal link schedule time-shares a small number of optimal subsets of links (~L+1 for a network with L links) in order to achieve the required data rates. The collection of optimal transmission modes depends on the level of ambient noise and the capacity allocations on links.

A byproduct of solving the scheduling and power control problem yields link sensitivities that provide the change in the minimal total average power with respect to a perturbation of the required data rate on a link. The minimal required average power is a convex function of the required data rates on each link. This leads us to a routing algorithm.

Testing of the invention revealed that that using minimum-energy paths to route traffic and TDMA (time division multiple access) to schedule links is near-optimal in low noise regimes and in the case where the required average data rates are small. As the level of ambient noise increases, or the required average data rates increase, our optimal routing policy exploits the use of multiple paths to support higher data rates, and the optimal scheduling policy makes use of concurrent transmissions on links. We find that non-minimum energy paths can be exploited to increase throughput, despite the fact that all links share a common bandwidth.

Preferred embodiments of the invention will now be described. Example implementations and simulations are provided, but do not limit the invention in its broader aspects and are not necessary for understanding or implementing the methods of the invention as fully and separately described. Methods of the invention may be implemented in any node of a network, or in a dedicated centralized control node.

Suppose there are N stationary nodes, labeled by the integers 1, 2, ..., N. A set $\epsilon$ of $L_\epsilon = |\epsilon|$ transmission links, among the possible N (N−1) links between nodes, constitutes a network topology.

For simplicity of exposition, we divide time into slots, each of equal duration and indexed by the positive integers. Transmissions begin and end on slot boundaries. For a given link $l=(i,j)$, the transmitter node i uses a signal power $P_m(l)$ in slot m. The path gain from node i to node j is given by $G(i,j)$, and can model the effects of signal attenuation due to distance, channel fading and shadowing, as well as antenna gain patterns. We model path gains $G(i,j)$ as being constant over the time frame being scheduled. As mentioned, the invention is most effective with relatively constant channel conditions. If the channel conditions are rapidly changing, the path may still be assumed constant, but the time period of scheduling might be kept smaller, e.g., scheduling over 100 time slots instead of over 200 in response to changing channel conditions.

The transmitting and receiving nodes of link l are denoted by T(l) and R(l) respectively. The received signal power at node R(l) in slot m from the transmitter T(l) is thus given by $P_m(l)G(T(l), R(l))$. However, signals emanating from other transmitters appear to the receiver R(l) as interference, and there is ambient thermal noise to contend with as well. The signal to interference and noise ratio (SIR) for link l in slot m is defined as $$\gamma_m(l) = \frac{G(T(l), R(l))P_m(l)}{\sum_{k:k \neq l} P_m(k)G(T(k), R(l)) + n_{R(l)}} \quad (1)$$

where $n_j$ is the "ambient noise" power at the receiver at node j. For now we assume that the ambient noise power at each node does not change from slot to slot, but we will relax this assumption later in a hierarchical approach that represents a preferred embodiment.

The data rate of the single wireless channel embodied by link l during slot m can be modeled as a function of the SIR, $\gamma_m(l)$. It is assumed that the achieved data rate on link l during slot m, $X_m(l)$, is a linear function of the SIR, $\gamma_m(l)$, and the total available bandwidth W. For simplicity of explanation, all links are assumed to share the same frequency band of width W. Using the Gaussian approximation to compute the bit-error-rate (BER), the data rate of a link l with a tolerable BER of $10^{-q}$ and using BPSK modulation is given by $$X_m(l) = W' \gamma_m(t) \text{ where } W' = \frac{W}{2q \log_2 10}.$$

Let $\vec{P}_m = (P_m(1), P_m(2), \ldots P_m(L_\epsilon))$ be the network power vector for slot m. Let $P^{max}(i)$ be the maximum transmission power for node i. Let $\epsilon(i)$ be the links in $\epsilon$ that originate at node i.

Each node must conform to the peak transmission power constraint in every slot:

$$0 \leq \sum_{i \in \epsilon(i)} P_m(l) \leq P^{max}(i) \text{ and} \quad (3)$$

$$0 \leq P_m(l), \text{ for all } m \geq 1.$$

Using (2) and (1), the achieved data rate for link l in slot m is $$X_m = W' \left( \frac{G(T(l), R(l))P_m(l)}{\sum_{k:k \neq l} G(T(k), R(l))P_m(k) + n_{R(l)}} \right).$$

The long-term average rate of link l is then defined as $$X^{avg}(l) = \lim_{m \to \infty} \frac{1}{m} \sum_{k=1}^{m} X_k(l).$$

For each link l, let C(l) be a given minimum acceptable average data rate, i.e., we must have $$X^{avg}(l) \geq C(l), \text{ for all } l \in \epsilon. \quad (4)$$

Define the required minimum average rate vector as $$\vec{C} = (C(1), C(2), \ldots, C(L_\epsilon)).$$

The average power consumed by the transmitter for link l, $P^{avg}(l)$, is $$P^{avg}(l) = \lim_{m \to \infty} \frac{1}{m} \sum_{k=1}^{m} P_k(l).$$

Define the average network power vector as $$\vec{P}^{avg} = P^{avg}(1), P^{avg}(2), \ldots, P^{avg}(L_\epsilon).$$

There may or may not exist a sequence of network power vectors $\vec{P}_1, \vec{P}_2, \ldots$ that satisfy (3) and (4). If there does exist a sequence of such network power vectors, our aim is to minimize the total average power given by $h(\vec{P}^{avg})$, where $$h(\vec{P}^{avg}) = \sum_{l \in \epsilon} P^{avg}(l).$$

A systematic approach is used by the invention to compute a schedule of network power vectors $\vec{P}_1, \vec{P}_2, \ldots$, satisfying the peak power constraints (3) and the minimum average rate constraints (4), such that $h(\vec{P}^{avg})$ is minimized. This primal problem is succinctly stated as $$\min\{h(\vec{P}^{avg})\} \text{ subject to (3) and (4).} \quad (6)$$

Note this optimization involves choosing optimal power levels in each slot for each transmitter. Using a duality approach the problem is reduced to a convex optimization problem over a single slot. The duality approach is preferred to solve the stated minimization in view of constraints. More generally, however, a linear program may be used to reach a solution, as will be appreciated by artisans.

Duality Approach

Let $\vec{n} = (n_{R(1)}, n_{R(2)}, \ldots n_{R(L_\epsilon)})$ be ambient noise power vector. Let the value of the optimal cost in the problem (6) as a function of $\vec{C}$ and $\vec{n}$ be denoted by $H(\vec{C}, \vec{n})$. If for a given value of $\vec{C}$ and $\vec{n}$, no schedule of network power vectors exists satisfying (3) and (4), define $H(\vec{C}, \vec{n}) = +\infty$. It can easily be seen that for a fixed value of $\vec{C}$, $H(\vec{C}, \vec{n})$ is monotone increasing in $\vec{n}$. Also, it can be shown that for a fixed value of $\vec{n}$, $H(\vec{C}, \vec{n})$ is a convex function of $\vec{C}$.

Define a set of dual variables $\vec{\beta} = \{\beta(1), \beta 2, \ldots, \beta(L_\epsilon)\}$ for each link. Define a "potential" function V according to $$V(\vec{P}, \vec{C}, \vec{X}) = h(\vec{P}) + \sum_{l \in \epsilon} \beta(l)[C(l) - X(l)].$$

The dual objective function is defined as $$g(\vec{\beta}) = \min\{V(\vec{P}^{avg}, \vec{C}, \vec{X}^{avg})\} \text{ subject to (3)}.$$

Note the absence of the minimum rate constraints (4) in the definition of $g(\vec{\beta})$. A primary advantage of the restatement is that the number of variables to be optimized is smaller. A secondary advantage is that the optimal values of the dual variables yield link rate sensitivities, used in embodiments of the invention for routing. For any non-negative vector $\vec{\beta}$, using (4), note that $$H(\vec{C}, \vec{n}) \geq \min\{V(\vec{P}^{avg}, \vec{C}, \vec{X}^{avg})\}, \text{ subject to (3) and (4)} \quad (7)$$

$$\geq \min\{V(\vec{P}^{avg}, \vec{C}, \vec{X}^{avg})\}, \text{ subject to (3)}$$

$$= g(\vec{\beta}).$$

Thus, for any non-negative vector $\vec{\beta}$, the minimum value of the objective function in the optimization problem (6) is lower bounded by $g(\vec{\beta})$. This observation leads to the dual optimization problem, $$\max\{g(\vec{\beta}): \vec{\beta} \geq \vec{0}\}. \quad (8)$$

A convexity argument can be used to show that in fact we have $$H(\vec{C}, \vec{n}) = \max\{g(\vec{\beta}): \vec{\beta} \geq \vec{0}\} \quad (9)$$

$$= g(\vec{\beta}^*).$$

Computation of $g(\vec{\beta})$ involves optimizing over all schedules of network power vectors satisfying the peak power constraint in every slot. However, since the potential function $V(\vec{P}, \vec{C}, \vec{X})$ is linear in $\vec{P}, \vec{C}$, and $\vec{X}$, it follows that $g(\vec{\beta})$ can be computed by an optimization over a single slot, i.e.

$$g(\vec{\beta}) = \min\{V(\vec{P}, \vec{C}, \vec{X}): \vec{P} \in S_P\},$$

where $\vec{X} = \vec{X}(\vec{P})$ is defined as in (2) and (1), and $S_P$ is defined as the polyhedral set $$S_P = \left\{\vec{P}: \sum_{i \in \epsilon(i)} P(l) \leq P^{max}(i) \text{ for all } i \text{ and } 0 \leq P(l) \text{ for all } l \in \epsilon\right\}.$$

Let M be the number of extreme points of $S_P$, and let $\vec{P}_m^{ext}$, $m = 1, 2, \ldots M$ denote the extreme points of $S_P$. By definition, each point in $S_P$ can be represented as a convex combination of $\vec{P}_m^{ext}$, $m = 1, 2, \ldots M$. An upper bound on M is $2^{L_\epsilon}$. If $M_i$ is the number of links emanating from node i, then $M = \prod_{i=1}^{N}(1+M_i)$.

A convexity argument then shows that $$g(\vec{\beta}) = \min\{V(\vec{P}_m^{ext}, \vec{C}, \vec{X}(\vec{P}_m^{ext})): 1 \leq m \leq M\}.$$

Thus, the complexity of computing $g(\vec{\beta})$ is O(M). In fact, note that $V(\vec{P}_m^{ext}, \vec{C}, \vec{X}, (\vec{P}_m^{ext}))$ is an affine function of $\vec{\beta}$, which implies that the dual objective function $g(\vec{\beta})$ is the pointwise minimum of M affine functions, i.e.

$$g(\vec{\beta}) = \min_{1 \leq m \leq M} \{a'_m \vec{\beta} + b_m\}. \qquad (10)$$

An iterative ascent algorithm may be used to solve the dual optimization problem of equation (8). Exploiting the piecewise linearity of $g(\vec{\beta})$, the iterative ascent algorithm converges in a finite number of iterations. Alternately, by introducing a slack variable, the dual optimization problem of equation (8) can be reduced to a linear program and be efficiently solved using interior point methods.

We'll now discuss a termination condition of the iterative ascent algorithm. For a given $\vec{n}$, if the required minimum rate vector $\vec{C}$ is infeasible, i.e. $H(\vec{C}, \vec{n}) = +\infty$, it can be seen that $g(\vec{\beta})$ is unbounded from above over the set of all $\vec{\beta} \geq 0$. Otherwise, it is easy to see that $$H(\vec{C}, \vec{n}) \leq \sum_{i=1}^{N} P^{max}(i).$$

Thus we can safely declare $\vec{C}$ and $\vec{n}$ infeasible if we find a value of $\vec{\beta}$ such that $$g(\vec{\beta}) > \sum_{i=1}^{N} P^{max}(i).$$

Computing an Optimal Link Scheduling Policy

Solving the dual problem (8) yields the optimal dual variable vector and extremal network power vectors $P^{*,i}$, such that $$g(\vec{\beta}^*) = \min\{g(\vec{\beta}): \vec{\beta} \geq 0\} \qquad (11)$$
$$= V(\vec{P}^{*,i}, \vec{C}, \vec{X}(\vec{P}^{*,i})).$$

The vectors $P^{*,i}$ are extreme points of $S_P$ that represent optimal transmission modes and the power levels of the transmitters in those transmission modes. In other words, assuming $H(\vec{C}, \vec{n})$ is finite, an optimal schedule of network power vectors exists that consists solely of these extremal network power vectors $P^{*,i}$. This means that in the optimal policies we find, in each slot, every node is either not transmitting at all, or is transmitting at the maximum possible peak power to exactly one receiver. Moreover, since a hyperplane in $(L_\epsilon + 1)$ dimensional Euclidean space is determined by $L_\epsilon + 1$ linearly independent points contained within it, an optimal policy can be constructed that consists of at most $L_\epsilon + 1$ extremal network power vectors $P^{*,i}$. Let K be the number of extremal network power vectors $P^{*,i}$ such that (11) holds. Define $\hat{K} = \min\{K, L_\epsilon + 1\}$. We thus have $$H(\vec{C}, \vec{n}) = g(\vec{\beta}^*) = V(\vec{P}^{*,i}, \vec{C}, \vec{X}(\vec{P}^{*,i})),$$

for all i such that $1 \leq i \leq \hat{K}$.

In any optimal policy (assuming $H(\vec{C}, \vec{n})$ is finite), the average rate on each link l, $X^{avg}(l)$, is exactly equal to $C(l)$. Otherwise, we could decrease the total average power further without violating any rate constraints, thus contradicting the optimality of the solution. Let $X^{*,i}(l)$ denote the rate of link l corresponding the optimal extremal network power vector $P^{*,i}$. Assuming $H(\vec{C}, \vec{n})$ is finite, it can be shown that (9) guarantees the existence of a "weight vector" $\vec{\lambda}^* = \{\lambda^*(1), \lambda^*(2), \lambda^*(\hat{K})\}$ such that the equations (12) and (13) below are satisfied:

$$\sum_{i=1}^{\hat{K}} \lambda^*(i) X^{*,i}(l) = C(l) \text{ for all links } l \in \varepsilon \qquad (12)$$

$$\sum_{i=1}^{\hat{K}} \lambda^*(i) = 1 \text{ where } \lambda^*(i) \geq 0. \qquad (13)$$

Note that $\hat{K} \leq L_\epsilon + 1$, so the above system of equations is always overdetermined. There must be $\hat{K} + 1$ of these equations which are linearly independent. Once we have identified such a set of equations, we solve them by inverting a $(\hat{K}+1) \times (\hat{K}+1)$ matrix.

The value of $\lambda^*(i)$ indicates the relative frequency at which the extremal network power vector $P^{*,i}$ is utilized in an optimal policy. This then determines a family of optimal policies, which can be constructed by alternating between the extremal network power vectors in accordance with the weight vector $\vec{\lambda}^*$. A specific optimal policy, for example, can be constructed using a pseudo-random number generator to select which extremal network power vector is used in each slot, such that the network power vector $P^{*,i}$ is used with probability $\lambda^*(i)$.

Reducing Complexity

The algorithm developed to solve the dual problem considers all M transmission modes. However, in the optimal schedule we have no more than $L_\epsilon + 1$ transmission modes. Since M can be as large as $2^{L_\epsilon}$, the complexity of minimizing the dual objective function can be exponential. Thus, reducing the set of possible transmission modes considered can greatly reduce complexity. A natural consequence of the invention for a network of nodes with omni-directional antennas is that no node transmits or receives data at the same time in the optimal schedule due to high self interference. This observation can reduce the number of candidate transmission modes significantly. In general, in many cases it is possible using heuristics to eliminate many obviously inefficient transmission nodes from consideration, since they are unlikely to be used in an optimal policy.

To summarize the preferred scheduling embodiment just discussed and make some general observations about it, artisans will appreciate that the general steps included are to measure the channel parameters between transmitter and receivers in order to assess the corresponding data rates on each link for each possible transmission mode. Using a primal optimization approach, duty cycles of each transmission modes in an optimal scheduling policy can be calculated by formulation of the problem as a linear program. Alternatively, using a dual optimatization approach, we can first identify a relatively small set of transmission modes that comprise an optimal scheduling policy. The identification of this small set of transmission modes can also be posed as a linear program. Once such a set of transmission modes is identified, a set of linear equations can be solved to identify the duty cycles of each transmission mode in the set. Once an optimal scheduling policy is calculated, it can be disseminated to all transmitters and receivers so that the optimal transmission modes can be realized in a synchronous manner.

Hierarchical Scheduling

For scheduling a network with a large number of links, increased speed may be realized by taking a hierarchical approach while applying the general scheduling discussed above. This can avoid a large amount of computation when the number of links renders the scheduling calculation too expensive. The basic idea is to schedule links hierarchically. In the hierarchical approach, we partition the set of edges $\epsilon$ into J disjoint subsets of edges $\epsilon(1)$, $\epsilon(2)$, ... $\epsilon(J)$, called clusters. We thus have $\epsilon = U_{j=1}^{J} \epsilon(j)$. Since the links in the same cluster must coordinate to implement the scheduling algorithm discussed above, it is convenient to group links into clusters such that the links belonging to the same cluster are in geographic proximity to each other.

Let $\vec{C}(j)$ be the minimum rate vector for cluster j, i.e. the components of $\vec{C}(j)$ consist of the components of $\vec{C}$ which are the minimum rates for each of the links belonging to cluster j. Similarly, let $\vec{n}(j)$ be the ambient noise vector for cluster j, i.e. the components of $\vec{n}(j)$ consist of the components of $\vec{n}$ which are the ambient noise powers for each of the receivers belonging to cluster j.

Decoupling the Scheduling for Each Cluster

When we partition the links in the entire network into clusters, we assume that the number of links in any given cluster is limited so that if the network consisted of only the links in the cluster, it is computationally feasible to use the method described above to schedule the links in the cluster. Let $H_j(\vec{C}(j), \vec{n}(j))$ be the minimal total average transmit power required for meeting the average data rate requirements for only those links belonging to cluster j. In other words, the links in all other clusters besides cluster j are assumed to be absent or idle in the definition of $H_j(\vec{C}(j), \vec{n}(j))$. The value of $H_j(\vec{C}(j), \vec{n}(j))$, as well as a corresponding schedule for the links in cluster j, can be found by application of the embodiments described above.

Of course, the noise at a given receiver will not only consist of interference from other links in the same cluster and ambient thermal noise, but interference from links in different clusters will also be present. The power of the interference from other clusters will vary from slot to slot, in accordance with the link schedules used in each of the clusters. However, suppose we model the additional noise from interference in other clusters as static ambient noise.

Specifically, suppose that $\vec{N}(j) = (N_j(1), N_j(2), \ldots, N_j(L_{\epsilon(j)}))$ consists of the total "average ambient noise" for the receivers of links in cluster j. In order to calculate the value of $\vec{N}(j)$, first define $\vec{P}^{avg}(k) = (P_k^{avg}(1), P_k^{avg}(2), \ldots P_k^{avg}(L_{\epsilon(k)}))$ as the average transmission power vector for the transmitters of the links in cluster k. The value of $\vec{P}^{avg}(k)$ is obtained as a byproduct of computing $H_k(\vec{C}(k), \vec{n}(k))$ and the associated schedule for cluster k. Indeed we have $$H_k(\vec{C}(k), \vec{n}(k)) = \sum_{l' \in L_{\epsilon(k)}} P_k^{avg}(l').$$

Consider link l' in cluster k. The transmitter of link l' transmits with average power $P_k^{avg}(l')$. Thus the average power of the interference caused by link l' in cluster k to the receiver of link l in cluster j is $G(T(l'), R(l))P_k^{avg}(l')$. The value of $N_j(l)$ is obtained by summing the total contribution from all such links l' in all other clusters other than j, and adding the thermal ambient noise at receiver $n_{R(l)}$, i.e. we have $$N_j(l) = n_{R(l)} + \sum_{k: k \neq j} \sum_{l' \in L_{\epsilon(k)}} G(T(l'), R(l))P_k^{avg}(l'). \tag{14}$$

Let $\vec{N}$ be the concatenation of the noise vectors $\vec{N}(1)$, $\vec{N}(2), \ldots, \vec{N}(J)$. From the discussion above, the vector $\vec{N}$ is determined by the global rate requirement vector $\vec{C}$ and the global ambient thermal noise vector $\vec{n}$. We can denote this mapping by a function $F(.,.)$, i.e.

$$\vec{N} = F(\vec{C}, \vec{n}). \tag{15}$$

Coordinating the Clusters: Finding a Fixed Point

In general we will have $\vec{N} \geq \vec{n}$, so we need to take into account the effect of inter-cluster interference in the scheduling of each individual cluster. The actual ambient noise vector we seek is $\vec{N}^*$, where $\vec{N}^*$ satisfies the fixed point equation $$\vec{N}^* = F(\vec{C}, \vec{N}^*). \tag{16}$$

This equation may be solved iteratively. In particular, let $\vec{N}^k$ be the estimate of the solution at the $k^{th}$ iteration. We can start with a noise vector that consists only of ambient thermal noise, i.e. $\vec{N}^0 = \vec{n}$. We then find a sequence of estimates using the recursion $\vec{N}^{k+1} = F(\vec{C}, \vec{N})$. We have performed a series of numerical experiments, and have found in every case that such an iterative algorithm finds a fixed point.

If each component of $F(\vec{C}, \vec{N})$ is a monotone function of $\vec{N}$, it is easy to establish that the iterations above will also converge to the smallest solution of equation (16), assuming a solution exists. In the case where each cluster is sufficiently distant from all other clusters, all transmissions emanating from a given cluster can be modeled as a point source. In this case $F(\vec{C}, \vec{N})$ is a monotone function of $H_j(\vec{C}(j), \vec{N}(j))$ for all j, which in turn are monotone functions of $\vec{N}$. Hence, the convergence of the iterative algorithm can be proved when all clusters are sufficiently distant from each other. We also believe, but cannot prove, that $F(\vec{C}, \vec{N})$ is a monotone function of $\vec{N}$ in all cases.

To summarize, we propose that each cluster first calculates a schedule, assuming all other links in other clusters are idle and there is no inter-cluster interference. After this calculation, we can compute the incident average interference at each receiver from links that belong to other clusters. Taking into account this average inter-cluster interference, we again calculate a schedule for each cluster. Proceeding inductively, we recalculate the incident average interference for each receiver from the transmitters belonging to other clusters. We then again calculate a schedule for each cluster using the new value of incident average inter-cluster interference, and so on.

Accounting for Non-constant Inter-cluster Interference

After a fixed point solution $\vec{N}^*$ to (16) is found, we have a transmission schedule for each cluster in which we have assumed that the power of inter-cluster interference is constant. The constant is the average inter-cluster interference obtained from the solution to the fixed point equation (16).

However, since the emitted power from a cluster varies from slot to slot, this assumption is not true. Fortunately, essentially due to the convexity of the function $(a+bx)^{-1}$ with respect to x, the actual average SIR for any given link will be at least as large as the average SIR obtained by assuming that the power of inter-cluster interference is constant. Thus, the actual achieved data rate for each link is at least as large as it would be assuming constant power for inter-cluster interference. In practice, each cluster could communicate its schedule to nearby clusters, and the data rate used in each slot can be appropriately adjusted to account for the non-constant inter-cluster interference.

To prove this, suppose link l belongs to cluster j and let $X^{avg}(l)$ be the actual average data rate achieved for link l, taking into account that the power of the inter-interference varies from slot to slot. Also, let $\hat{X}^{avg}(l)$ be the average data rate achieved link l assuming that there is constant power ambient noise $N_j^*(l)$. We wish to show that $X^{avg}(l) \leq \hat{X}^{avg}(l)$.

Recall that $N^*_j(l)$ is determined from the solution to the fixed point equation (16). In particular, if $n_{R(l)}(m)$ is the total average ambient noise incident at the receiver R(l) in slot m, then $$N_j^*(l) = \lim_{n \to \infty} \frac{1}{n} \sum_{m=1}^{n} n_{R(l)}(m). \qquad (17)$$

Suppose the fraction of time in which the transmission mode i is used in the schedule for cluster j is $\lambda^*(i)$, where transmission mode i is given by $P_j^{*,i} = (P_j^{*,i}(1), P_m^{*,i}(2), \ldots, P_j^{*,i}(L_{\epsilon(j)}))$. Let $S_n(i)$ be the set of slots with index less than or equal to n where transmission mode i is used in cluster j. In fact we assume a stronger condition than in (17), namely $$N_j^*(l) = \lim_{n \to \infty} \frac{1}{|S_n(i)|} \sum_{n \in S_n(i)} n_{R(l)}(m), \qquad (18)$$

for each transmission mode i in the schedule for cluster j. This will be true, for example, if the pseudorandom number generators for selecting transmission modes in each of the different clusters are independent. Moving on to the proof, we have $$X^{avg}(l) = \lim_{n \to +\infty} \frac{1}{n} \sum_{m=1}^{n_l} X_{m_l}(l)$$

$$= \lim_{n \to +\infty} \frac{1}{n} \sum_{m=1}^{n_l} W' \left( \frac{G(T(l)_l R(l)) P_{m(l)}}{\sum_{k: k \neq l} G(T(k)_l R(l)) P_m(k) + n_{R:(l)}(m)} \right)$$

$$= \sum_i \lambda^*(i) \lim_{n \to +\infty} \frac{1}{|S_n(i)|}$$

-continued $$\sum_{m \in S_n(i)} W' \left( \frac{G(T(l)_i R(l)) P_j^{*,i}(l)}{\sum_{k: k \neq l} G(T(k)_2 R(l)) P_j^{*,i}(k) + n_{R(l)}(m)} \right)$$

$$\geq \sum_i \lambda^*(i) W' \left( \frac{G(T(l)_l R(l)) P_j^{*,i}(l)}{\sum_{k: k \neq l} G(T(k)_2 R(l)) P_j^{*,i}(k) + N_j^*(l)} \right)$$

$$= \sum_i \lambda^*(i) X^{*,i}(l) = \hat{X}^{avg}(l) \geq C(l)_2$$

where the first inequality follows from (18) and the convexity of the function $(a+bx)^{-1}$ with respect to x.

Scheduling at the Cluster Level

Above, we have assumed that the links in each cluster can be active in each slot, i.e., all of the clusters are active in each slot. In certain situations, this may result in very high levels of inter-cluster interference, particularly when the links in different clusters are in close proximity.

As an alternative, we can group the clusters into different edge sets. A given edge set consists of the union of some subset of all the clusters, and each cluster belongs to exactly one edge set. The set of all slots is partitioned in such a way that each slot is reserved for links that belong to a given edge set.

With a suitable grouping of clusters into edge sets, we can insure that the clusters belonging to a given edge set are sufficiently separated in space. This will then limit the inter-cluster interference for clusters belonging to the same edge set. Each edge set can then be scheduled using the method discussed in the previous subsections.

More generally, we could formulate the cluster scheduling problem in a similar way to the link scheduling problem considered a above on an entire network basis. However, it appears that satisfactory schedules can be found by only considering a small collection of edge sets, where each edge set is assigned the same fraction of the overall system bandwidth. Moreover, by limiting the number of edge sets to a small constant, the scalability of the overall approach is significantly enhanced, both in terms of computation complexity, and the ease to which the overall algorithm can be implemented in a distributed way. We also note that, alternatively, the edge sets can be multiplexed in frequency rather than in time, as artisans will recognize.

Routing and Capacity Allocation

As described above, scheduling conducted according to the invention can find an optimal link scheduling and power control policy to support a given traffic rate on each link in the network while consuming minimum power. Additionally, with a change in the statement of the constraints, scheduling of the invention may be used to find optimal link and power control policies to maximize data capacity. We also have developed a method to construct a policy which allocates traffic rates on each link in accordance with a routing algorithm, given a traffic matrix which describes the rate at which traffic is to be carried between specific source-destination pairs. The routing algorithm is guided by the computation of the minimum cost associated with optimal scheduling and power control for supporting traffic rates on each link that have already been allocated, as described in the previous section.

For example, consider a series of iterations, where at a given iteration we wish to support a small amount of additional traffic from one of the given source-destination pairs. Initially, no traffic is supported, i.e. the required minimum data rate on each link is zero. We compute the optimal values for the dual variables, $g(\vec{\beta})$. Using $g(\vec{\beta})=\min\{V(\vec{P}, \vec{C}, \vec{X}): \vec{P} \in S_P\}$, we can estimate the cost of supporting additional traffic on each link using a first order Taylor series approximation. For example, suppose we wish to evaluate a given route r. Let $\vec{r}$ be the $L_\epsilon$ dimensional vector, such that the component $r(l)=1$ if link l is included in the route $\vec{r}$, and $r(l)=0$ otherwise. If we route an additional $\epsilon$ units of traffic along route r, the required data rate vector will increase from $\vec{C}$ to $\vec{C}+\epsilon \vec{r}$. The cost of supporting the additional $\epsilon$ units of traffic along route r can be determined from the approximation $$H(\vec{C}=\epsilon \vec{r})=H(\vec{C})+\epsilon \sum_{l \in \varepsilon} \beta^*(l)r(l).$$

Therefore, in order to determine the best possible path along which an additional increment of traffic should be routed, we can use a shortest path algorithm (such as Dijkstra's algorithm or the Bellman-Ford algorithm), where we set the weight for link l to the sensitivity value $\beta^*(l)$. After we have identified the shortest path, we attempt to support the additional traffic along this path. If the new value of $\vec{C}$ is infeasible, we either reduce the step-size $\epsilon$ until the additional traffic can be supported, try supporting additional traffic for another source-destination pair, or otherwise reach a pre-specified termination condition.

Indeed, since $H(\cdot)$ is convex, we can use the optimal routing framework developed by Bertsekas et al. (e.g., see, D. Bertsekas and J. Tsitsiklis, "Parallel and Distributed Computation: Numerical Methods", Prentice Hall 1989.). In this class of algorithms, any feasible routing is first chosen. By incrementally adjusting the routing in an iterative manner, flows are shifted towards shortest paths at each iteration, and eventually a globally optimum routing is obtained. There are many possible variations, for example regarding whether flow is shifted simultaneously for every source destination pair, or whether flow is shifted one at a time for each source destination pair. In the present context, we are faced with a more difficult problem, since $H(\cdot)$ is not differentiable everywhere. In addition, since evaluating the function $H(\cdot)$ is not trivial, it is more difficult to ascertain whether a given routing is feasible, i.e. the capacity of a given link depends on the rate carried by other links. Nevertheless, our initial numerical experiments and the framework developed by Bertsekas et. al. suggest that such an approach may be quite useful in practice.

The potential energy efficiency of a given link can be evaluated, assuming that all other links are idle. For our model, the minimum transmission energy required per bit on a link (i,j) is inversely proportional to G(i,j). A minimum energy path is defined as a path which has the smallest possible energy required to transport a fixed amount of data, irrespective of the delay associated with transporting that data. Previous work on routing in wireless networks (for example see, S. Singh, M. Woo and C. S. Raghavendra, "Power-aware routing in mobile ad hoc networks", Proc. of Fourth Annual ACMREEE Conference on Mobile Computing and Networking pp. 181-190, October 1998) is focused on energy efficiency without regard to delay, i.e., such work proposes using minimum energy paths.

We find that the paths over which traffic is allocated in some optimum routings does not always correspond to using minimum energy paths. Our simulations revealed, however, that when required data rates are sufficiently low, our routing framework will apparently always use minimum energy paths

EXPERIMENTAL SIMULATION EXAMPLES

To illustrate the invention, we will now discuss some simulation examples in the next section.

Example 1

Hierarchical Scheduling

Figure 2:
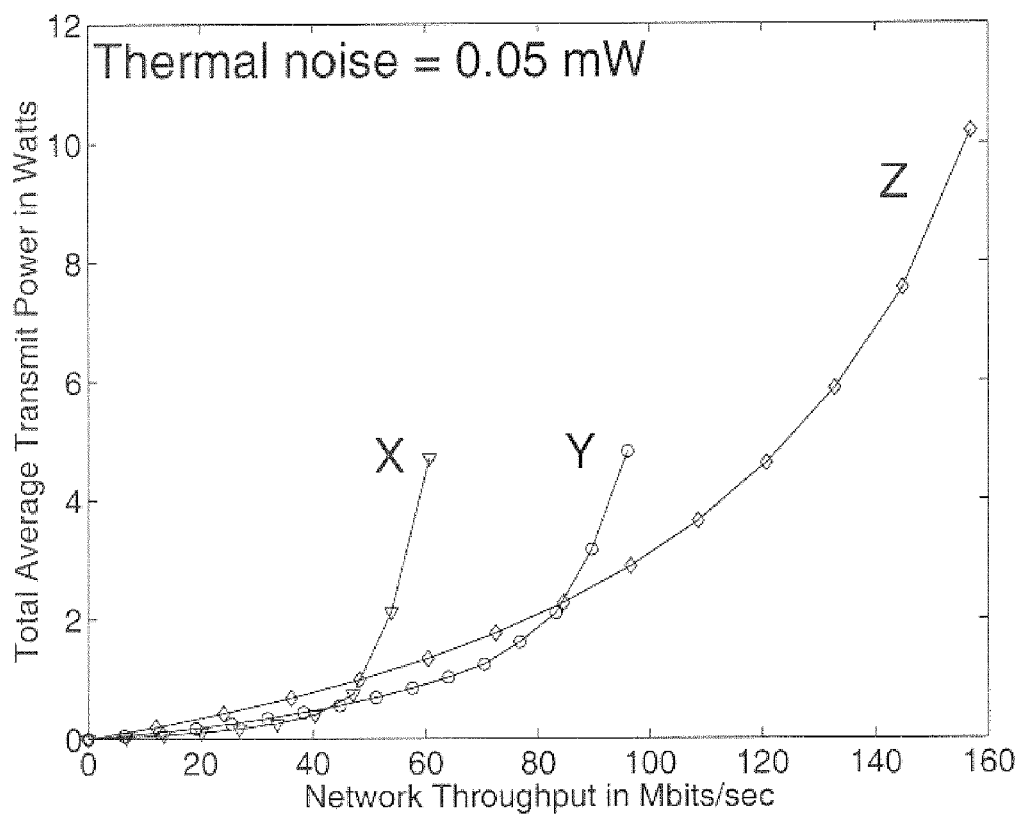
FIG. 2 is a graph of total average transmit power versus network throughput for three cluster schedules X, Y and Z reached in a numerical simulation and applied to the network topology of FIG. 1.
Figure 3:
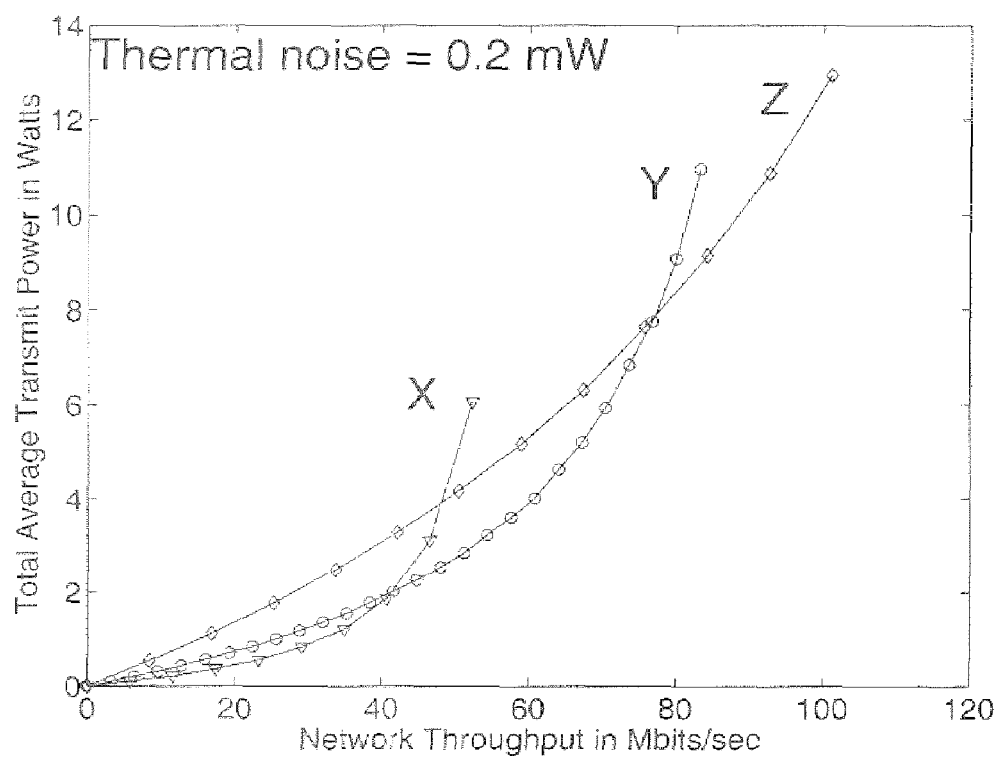
FIG. 3 is a graph of total average transmit power versus network throughput for the cluster schedules X, Y and Z reached in a numerical simulation and applied to the network topology of FIG. 1.

We consider a large fully connected wireless network consisting of 80 nodes and 150 links as shown in FIG. 1, distributed over a 200 m×200 m field. The network was divided into 16 clusters labeled by integers 1, 2, . . . 16, and each cluster consists of 5 or 6 nodes and 8 or 9 links. A link belongs to a cluster if the transmitting node is within or on the boundary of that cluster. Moreover, each link in the network belongs to exactly one cluster. The minimum average rate on all links in the network is set to the same value. The peak power of all links is identically set to 1 Watt and $W'=10^6$. We applied our hierarchical approach over the entire network by dividing it into edge sets in 3 different ways denoted by cluster schedules X, Y and Z. Cluster schedule X schedules a single edge set containing all 16 clusters. Cluster schedule Y schedules two edge sets each consisting of clusters in a checker board pattern. i.e., {1, 3, 6, 8, 9, 11, 14, 16} and {2, 4, 5, 7, 10, 12, 13, 15}. Each edge set in Y is scheduled for half the time. Cluster schedule Z schedules four edge sets containing clusters {1, 3, 9, 11}, {2, 4 ,10 , 12}, {5, 7, 13, 15} and {6, 8, 14, 16 } for a fourth of the time each. We plot the total average transmit power consumed by all the links in the network as a function of the (minimum) network throughput for each cluster schedule in FIGS. 2 and 3 corresponding to different values of thermal noise n=0.05 m W and n=0.2 mW respectively. The thermal noise at all receivers is the set to be the same.

We find that for very low data rates (between 0 to 41 Mbps in FIG. 3) it is energy efficient to enable all the 16 clusters simultaneously, regardless of the value of thermal noise. As the data rate along links increases (between 41 to 78 Mbps in FIG. 3), cluster schedule Y is the most energy efficient of the three configurations considered. For data rates beyond 78 Mbps (in FIG. 3), the energy efficient strategy is to enable the cluster schedule Z. For both values of thermal noise, Z is capable of supporting higher throughput than that achievable by X and Y.

For low rates, the optimal strategy in each cluster is a simple TDMA of links with long idle times. Therefore, the intercluster interference is small even when clusters are next to one another, making cluster schedule X the most energy efficient. However as the data rate requirement on links increases, links in each cluster are active for longer durations resulting in higher intercluster interference. In this case, schedules Y or Z are more energy efficient. We observed similar results to that in FIG. 6 for randomly generated network topologies as well.

Figure 6:
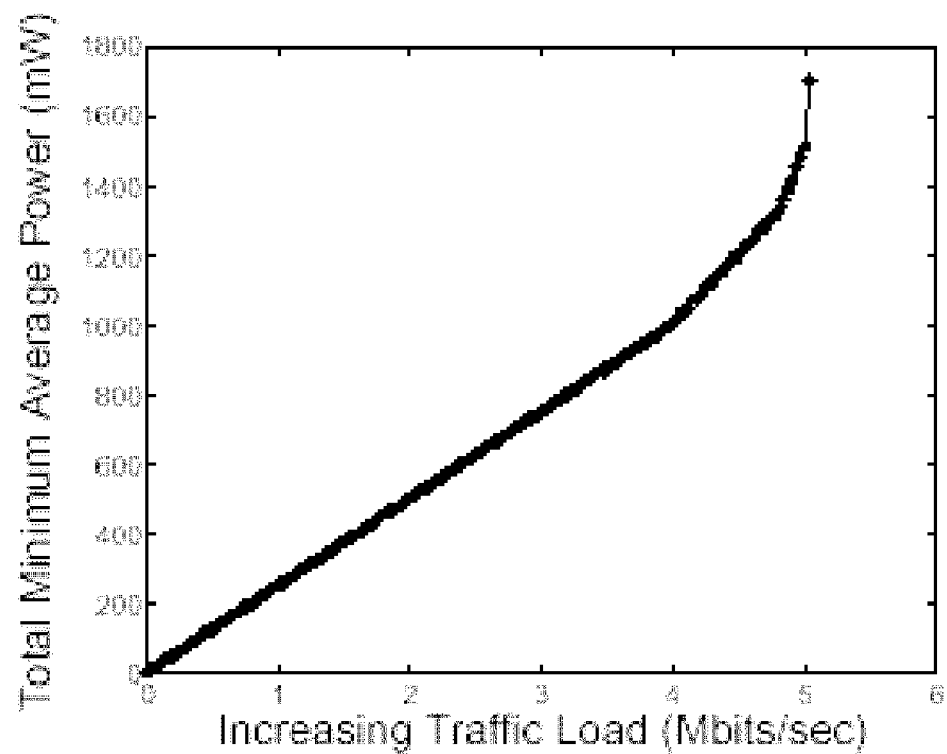
FIG. 6 plots the total average power with increasing traffic rates for the session between node 1 and node 5 in the network topology of FIG. 4.

Observe that by selecting a schedule based on the rate requirement we can realize an energy versus rate graph which is the minimum of the curves corresponding to the cluster schedules X, Y and Y in FIG. 6. In fact, by suitable timesharing of the cluster schedules we can achieve any rate in FIG. 6 which lies in the convex hull of the minimum of the three cluster schedule curves.

Our iterative approach converges quickly to the fixed point solution for all cluster schedules considered making it practical for implementation in large wireless networks. We also observed that as the distance between the clusters in an edge set increases, the difference between the actual data rate and that obtained by assuming constant inter-cluster interference (over a slot) decreases. This is attributed to the weaker dependence of the transmission strategy of each cluster to the inter-cluster interference. For cluster schedule Z, we found that the actual data rate was within 8% of the value obtained using constant inter cluster interference when the thermal noise n=0.2 mW.

Example 2

String Topology

Figure 4:
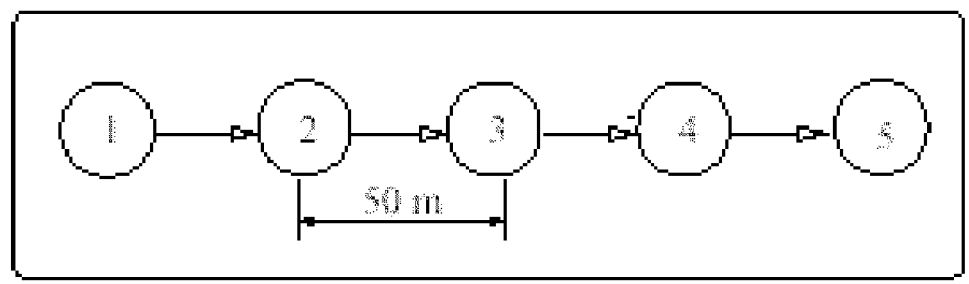
FIG. 4 is an example transport style network for application of methods of the invention and used in a numerical simulation of an embodiment of the invention.

A string topology consists of a row of nodes connected by means of directed links as shown in FIG. 4. This topology is useful as a transport network to carry data through short hops but over potentially long total distances through relay nodes. Node 1 is the source of data and node 5 is the sink. Each node in this example has an omnidirectional antenna, and all nodes have identical peak transmission power constraints of 1 Watt. The path-loss between nodes is modeled as an inverse square of the distance, i.e., $$G(i, j) = \frac{1}{d(i, j)^2}.$$

Figure 5:
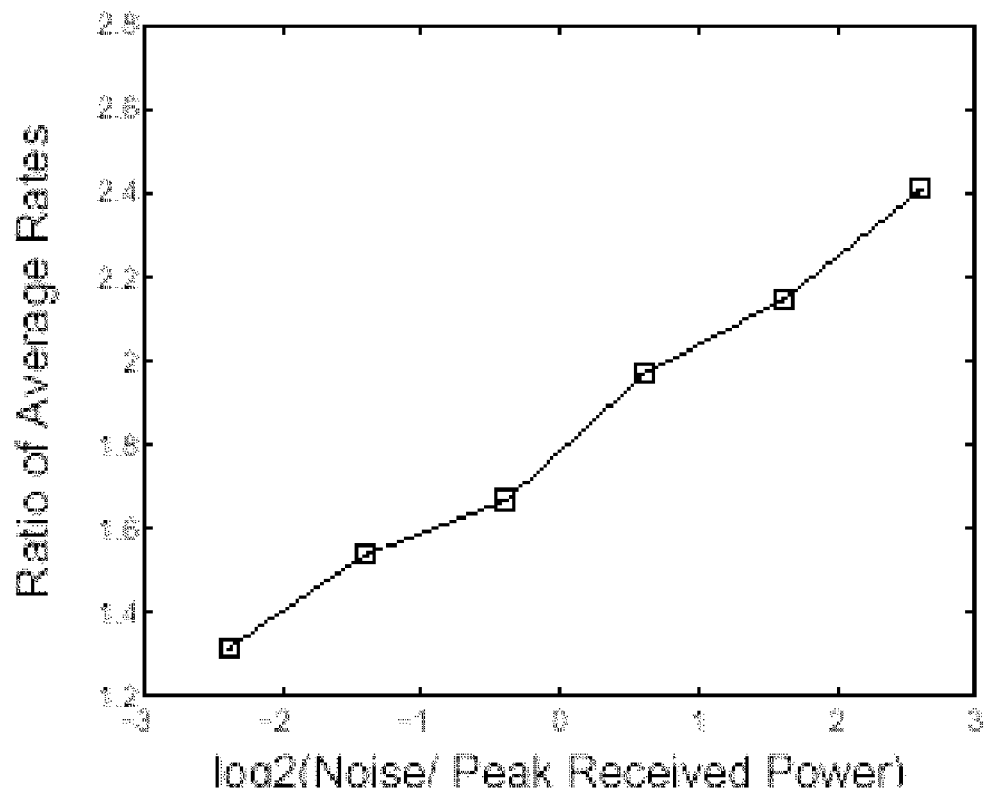
FIG. 5 plots the ratio of throughputs achieved by scheduling in accordance with the invention compared to TDMA with increasing values of ambient noise for the network topology of FIG. 4.

The ambient noise power at all the nodes is assumed to be constant. We compare the maximum throughput of the single session between node 1 to node 5 achieved by our link scheduling policy to a TDMA scheduling policy. The TDMA policy schedules exactly one link at a time, activating each link at maximum power for a fourth of the time. We plot the ratio of throughputs achieved by the our link scheduling algorithm to TDMA with increasing values of ambient noise in FIG. 5. The ambient noise is normalized with respect to the peak received power (from a single transmitter) in the network and is scaled by $\log_2(.)$ (for this and the remaining examples). The maximum throughput achieved by our policy is higher than TDMA for all values of ambient noise. In low noise regimes, TDMA is a near-optimal policy. However, as the level of ambient noise at nodes increases, the gains in throughput of our policy increase significantly. The optimal policy schedules multiple transmissions at the same time, even in fairly low ambient noise regimes, thereby exploiting spatial reuse and thus outperforming TDMA. This effect is more pronounced in moderate and high ambient noise regimes where the optimal policy schedules concurrent transmissions even though they are in close geographic proximity.

To get a sense of how energy efficient the optimal policy is as it supports increasing traffic demands, we plot the total average power with increasing traffic rates for the session between node 1 and node 5 in FIG. 6. For this experiment, we fix the level of the logarithm of the normalized value of ambient noise to −0.67. This value corresponds to the 3rd data point on the x-axis in FIG. 5. We also set W'=$10^7$.

FIG. 6 indicates that the total minimum average power is a linear function of the traffic demand for average rates below 4 Mbits/sec. Below 4 Mbits/sec, our scheduling method functioned essentially as TDMA. Specifically, only one link is active at any time, each link is active for the same fraction and for some fraction of time all links are idle. As the traffic demand of the session increases beyond 4 Mbits/sec, the total average power increases at a faster rate. For traffic load between 4 Mbits/sec and 4.98 Mbits/sec, the transmission modes in the optimal policy are given by [{(1, 2)}, {(2, 3)}, {(3, 4)} and {(1, 2), (4, 5)}]. For traffic loads above 4.98 Mbits/sec to the maximum throughput possible, the optimal transmission modes are [{(1, 2)}, {(2, 3)}, {(3, 4)}, {(1, 2), (3, 4)} and {(1, 2), (4, 5)}]. We see that in order to support high traffic loads, the optimal link scheduling policy activates a large number of links simultaneously. Note that the transmission modes in the optimal policy are half-duplex. Therefore, transmissions in the optimal schedule cannot consume a total average power of more than 2000 mW for this topology.

Example 3

Diamond Topology

Figure 7:
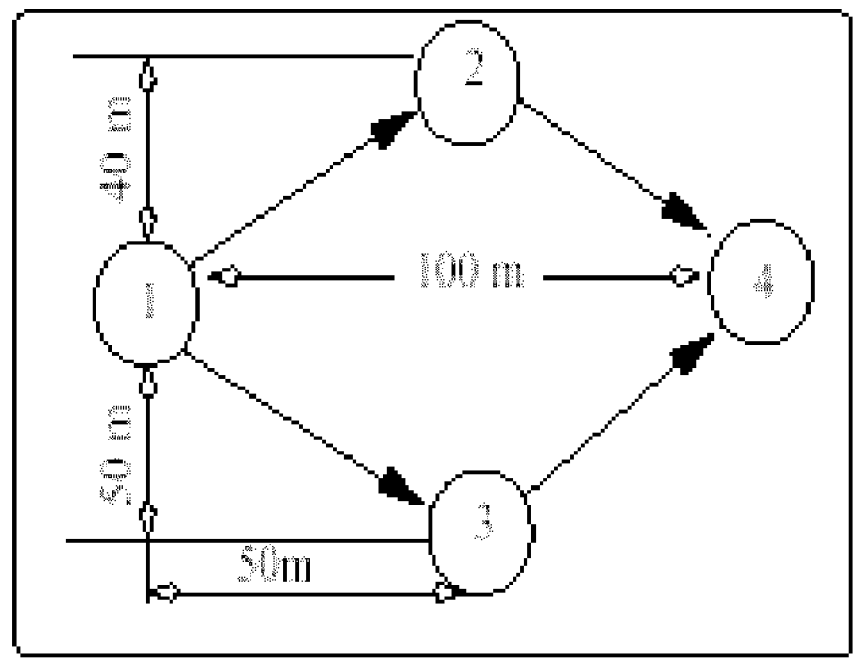
FIG. 7 illustrates an example asymmetric diamond topology for application of methods of the invention and used in a numerical simulation of an embodiment of the invention.

We also consider an asymmetric diamond topology as shown in FIG. 7 to illustrate the substantial increase in throughput by splitting traffic over multiple routes including paths that are energy inefficient. Nodes in this topology are equipped with omnidirectional antennas, and the peak transmission power each node is fixed at 1 Watt. Node 1 is the only source of data and node 4 is the sink. We assume $$G(1, 4) = \frac{1}{d(1, 4)^4};$$

the path loss between all other nodes is given by the inverse square law of distance. We consider our integrated routing and scheduling algorithm over this diamond topology, where all possible routes from the source to the destination are allowed except for the single hop route (1, 4). For comparison purposes, we also considered our scheduling algorithm where only the links (1, 2), and (2, 4) are allowed to be used, which corresponds to routing over a single minimum energy path 1→2→4.

Figure 8:
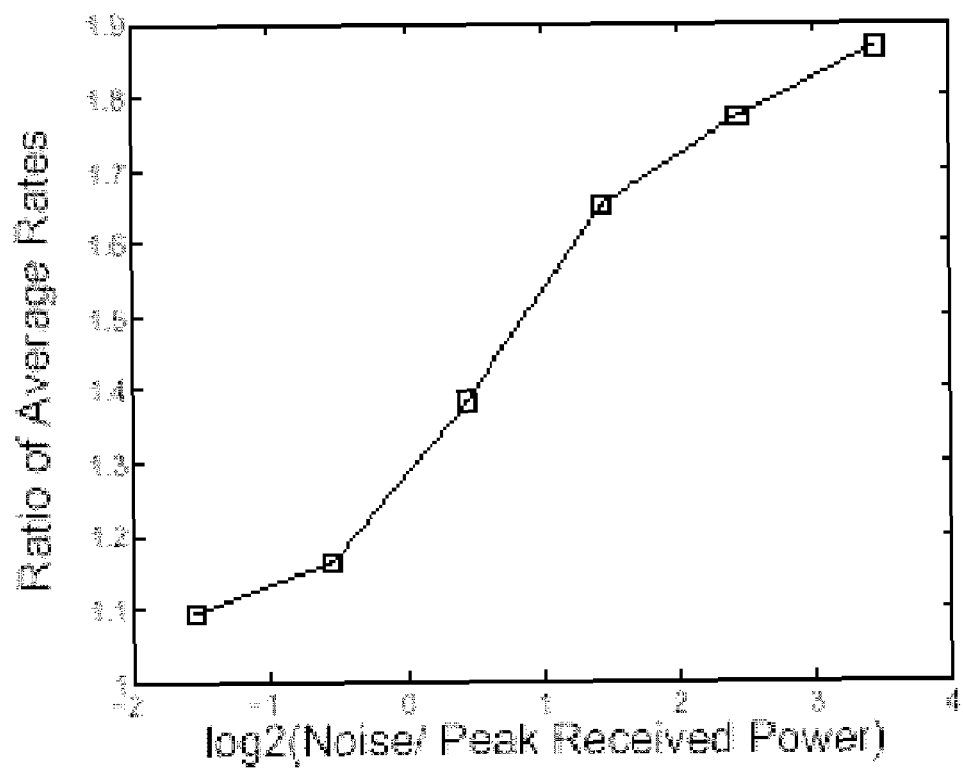
FIG. 8 plots throughput ratios for simulations on the FIG. 7 network topology.

We compare the ratio of throughputs for these polices in FIG. 8. Clearly, using multiple paths yields higher throughputs for all values of ambient noise. The increase in throughput by splitting traffic over multiple paths is significant even for moderate levels of ambient noise. This result is somewhat surprising since all links are sharing a common bandwidth and we have a per-node peak power constraint. An intuitive explanation of this is that by splitting the traffic over both paths, the transmission modes {(1, 2), (3, 4)} and {(2, 4), (1, 3)}, which do not have much interference can be alternated in time. This results in substantial delivery of data to the destination in every slot. If we only allow the path 1→2→4, in order to avoid self interference, the links (1, 2) and (2, 4) must be active one at a time, so that node 4 will only be delivered data in every other slot.

Figure 9:
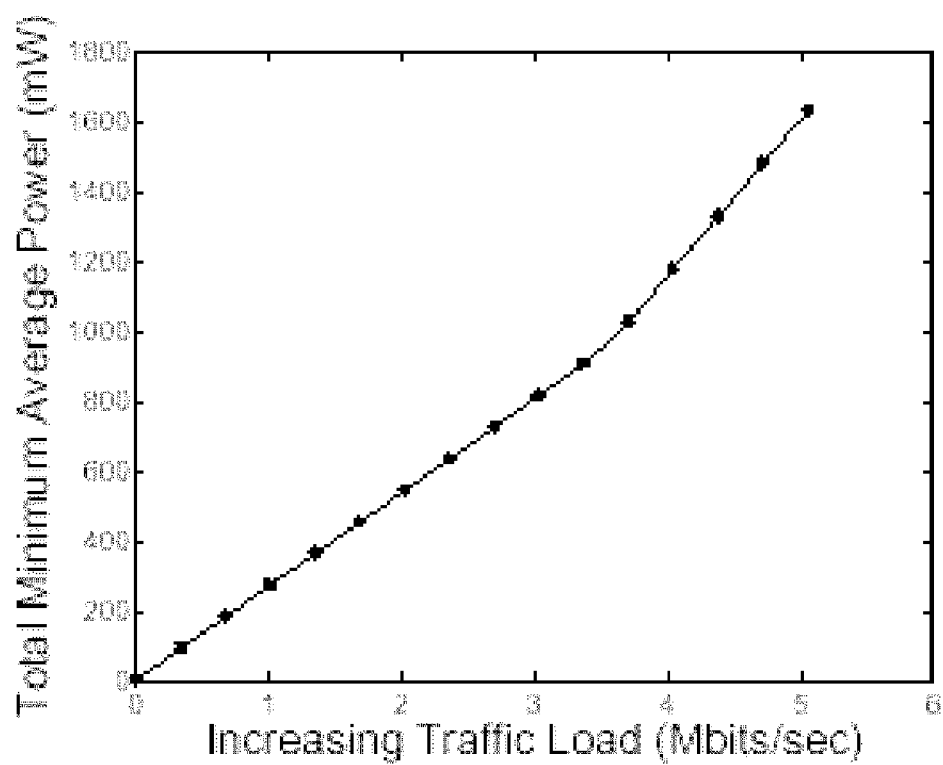
FIG. 9 plots average power required to achieve higher traffic demands for the example FIG. 7 network topology.

To illustrate energy efficiency issues, we plot the total minimum average power with increasing traffic demand at node 1 in FIG. 9. The logarithm of the normalized value of ambient noise for this point is 0.45 and corresponds to the 3rd data point on the x-axis in FIG. 8. We set W'=$10^7$. The maximum data rate achieved by TDMA using the minimum energy path 1→2→4 is 3.65 Mbit/sec. In comparison, our policy is capable of supporting a data rate of up to 5.05 Mbits/sec by using both the minimum energy path as well as the non-minimum energy path. For traffic loads below 3.65 Mbits/sec, our method produces a policy that functions as TDMA over the path 1→2→4. As the traffic load increases beyond 3.65

Mbits/sec, the method results in an optimal policy that starts using both paths by scheduling transmission modes {(1, 2), (3, 4)} and {(1, 3), (2, 4)} in addition to TDMA transmission modes. The average power required to achieve higher traffic demands beyond 3.65 Mbits/sec increases with a greater slope as can be seen in FIG. 9. The maximum throughput of 5.05 Mbits/sec is achieved by splitting traffic by using both paths and scheduling transmission modes {(1, 2), (3, 4)} and {(1, 3), (2, 4)} for a dominant fraction of time and scheduling transmission modes {(1, 2)}, {(2, 4)} for the remaining time. The optimal policy transmits a fair amount of traffic on both available paths, but transmits a greater share of its traffic on its minimum energy path. We have noted a 10 to 20% reduction in the throughput gains of the optimal policy than what is shown in FIG. 8 for the case when $$G(1, 4) = \frac{1}{d(1, 4)^2}.$$

Example 4

Hierarchical Topology

Figure 10:
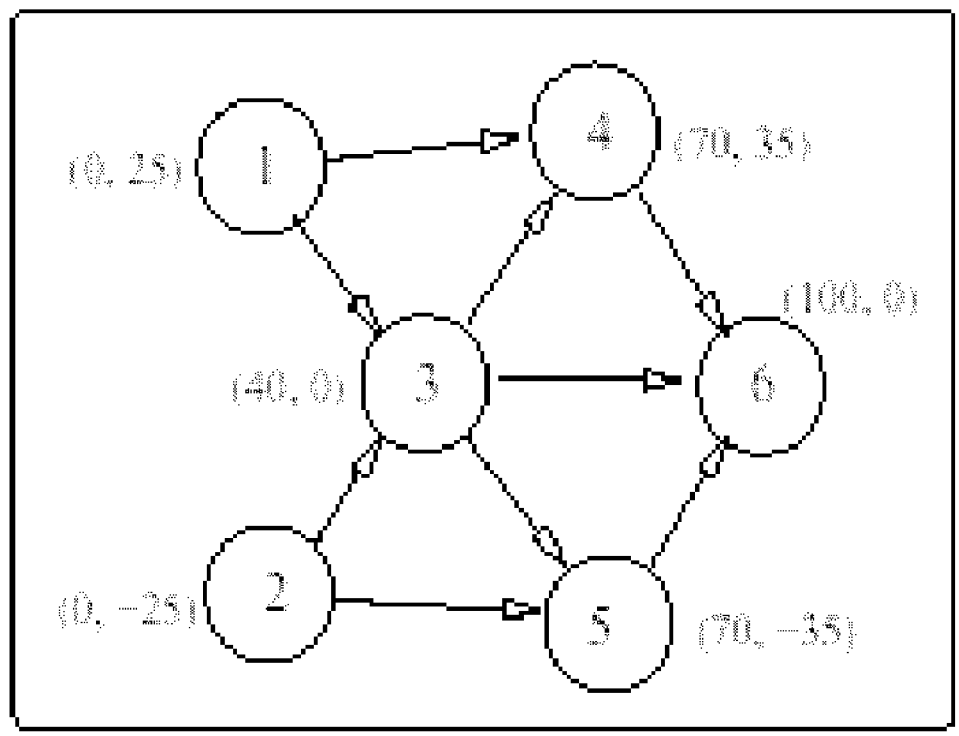
FIG. 10 illustrates an example hierarchical network topology for application of methods of the invention and used in a numerical simulation of an embodiment of the invention.
Figure 11:
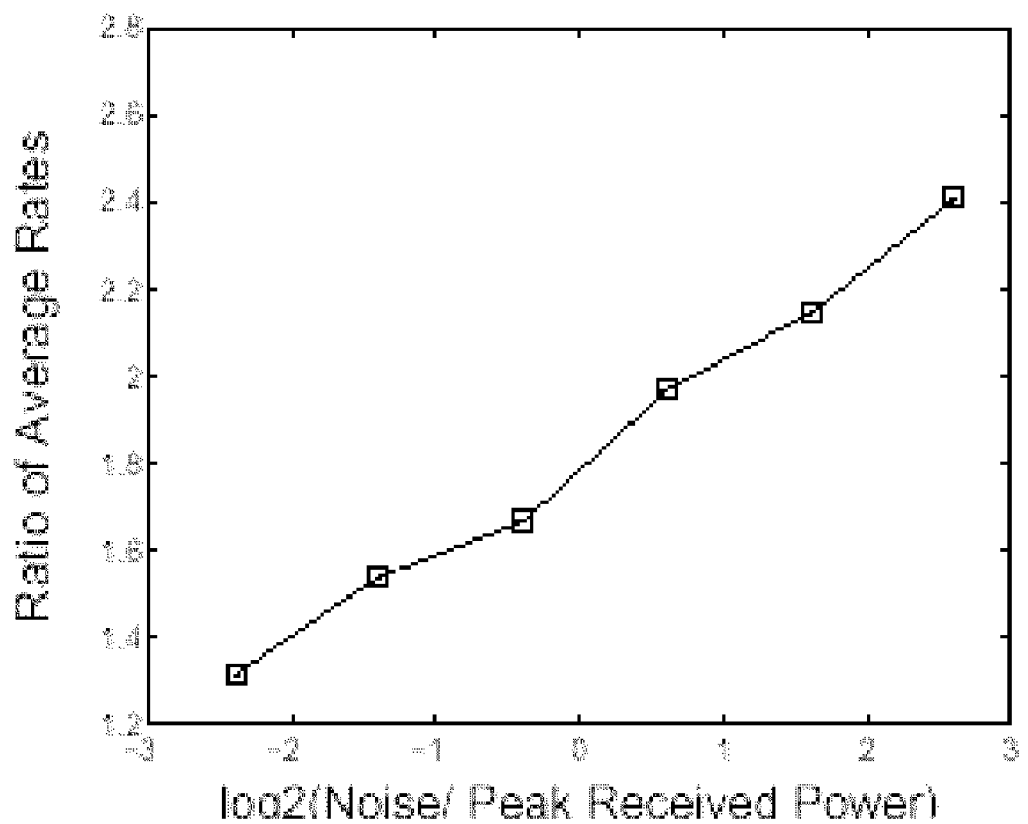
FIG. 11 plots the ratio of the total maximum throughput for a routing policy produced by application of methods of the invention versus that using only minimum energy paths as a function of ambient noise and in the example topology of FIG. 10.

A hierarchical topology as shown in FIG. 10 represents a complex topology such as an access network, where the number of nodes in each tier decrease as we get closer to the access point node 6. This experiment highlights the significant gains in throughput by jointly routing and scheduling to an alternative policy that optimally schedules links over pre-determined minimum energy routes. Nodes 1, 2 and 3 are sources of data and node 6 is the sink. We assume $$G(1, 6) = \frac{1}{d(1, 6)^4} \text{ and } G(2, 6) = \frac{1}{d(2, 6)^4};$$

the path loss between all other nodes is given by the inverse square law of distance. The minimum energy paths for the source nodes are: {1→3→6}, {2→3→6} and {3→6} respectively. Our integrated routing and scheduling algorithm is allowed to utilize all possible paths to route their data to node 6. We constrain the rates of each source to be identical. We plot the ratio of the total maximum throughput of our routing policy to that achieved by using only the minimum energy paths, as a function of ambient noise in FIG. 11.

We find that at low noise levels, our policy supports a throughput at least 30% more than the data rate achieved using minimum energy paths alone. As the level of ambient noise increases, our policy supports a significantly higher throughput. The base policy schedules links in a TDMA sequence for all values of ambient noise. The optimal policy schedules concurrent links even for low levels of ambient noise. In the optimal policy, nodes 1 and 2 route their traffic over non-minimum energy paths 1→4→6 and 2→5→6 respectively, apart from the minimum energy paths, for all values of ambient noise. For low ambient noise, the optimal policy schedules the transmission modes {(1, 3)}, {(2, 3)} and {(3, 6)} according to TDMA but also allows modes {(1, 4), (5, 6)} and {(2, 5), (4, 6)} to be active for reasonable fractions of time. As the level of ambient noise increases, the optimal policy splits node 3's traffic over paths 3→4→6 and 3→5→6. In fact, for sufficiently high ambient noise, the optimal policy schedules a large number of concurrent links, the dominant transmission modes being {(1, 4), (5, 6), (2, 3)} and {(2, 5), (4, 6), (1, 3)} and {(1, 4), (2, 5), (3, 6)}.

Generalized Embodiments

Methods of the invention as illustrated in the specific embodiments are a teaching of more general embodiments of the invention, as artisans will appreciate. As one example, methods of the invention can minimize the total average transmitter and receiver energy required to achieve the target capacity on links in the network. The constraints and the value being minimized/maximized is simply changed. Another constraint we could impose is a maximum peak power constraint for an arbitrary collection of nodes, rather than per each node. This may be useful to limit signal emissions from an entire network or subnetwork.

Minimizing Total Average Transmitter and Receiver Power

The total energy required to transmit a packet over a slot is the energy expended in the electronic circuitry to transmit at the desired power level. The efficiency of power amplifiers is typically around 10% and therefore, the total power consumption at node T(l) link is roughly 10P(l). Energy involved in coding (e.g. convolution coding) packets may be treated as negligible.

The energy required to receive a packet of information is comprised of two components. The first component is the electronic energy required to operate PLL's, registers, etc. and this is proportional to the data rate of the link. The second component is the energy required to decode the packet. While the decoding energy increases greatly as the SINR of the link decreases, this component of energy can be substantially lowered (by orders of magnitude) by using Application Specific Integrated Circuits to decode the received signal.

We therefore ignore the decoding energy component and coarsely model the power expended by a receiver R(l) as a linear function of the data rate of link l. Let $P_R(l)$ denote the power expended by node R(l) to receive data at rate X(l). Then $P_R(l)=\theta(l)X(l)$ where $\theta(l)$ is the energy expended per bit that is constant for each receiver node R(l). The new cost function that we would like to minimize is $$h(\vec{P}^{avg}) = \sum_{l \in \varepsilon} \alpha(l) P^{avg}(l) + \sum_{l \in \varepsilon} \theta(l) X^{avg}(l) \qquad (19)$$

where $h(\vec{P}^{avg})$ is the sum total of average transmission and receiver power. The dual objective function corresponding to the new primal function (19) would have an additional average receiver power term. The dual problem corresponding to the new primal problem is similar to (8) except that without loss of generality, we can constrain $\beta(l) \geq \theta(l)$ for each link $l \in \varepsilon$. This constraint, $\beta(l) \geq \theta(l)$, allows us to exploit the concavity property and use the link scheduling and power control algorithms originally developed to solve problem (8), for the new dual problem.

Accounting for receiver power in our method changes the choice of routes and the rate allocations on links in each route. The changes in the routing policy are more pronounced in a network where nodes are in fair proximity to each other. Using multiple hops in such topologies would consume higher receiver energy than using a single hop, making multi-hop routing inefficient. In such topologies, ignoring receiver energy consumption in the problem formulation would have yielded multi-hop routing as the optimal routing policy.

As described above, embodiments of the invention provide an integrated routing, scheduling and power control framework that is well suited for slow fading wireless channels which are relatively constant for long durations of time. Outdoor wireless channels with strong line-of-sight paths typically tend to have a very stable channel strength and could be approximated as a constant for a time interval (block fading model) ranging from a few to several minutes. By periodically measuring the channel and accounting for the changing traffic requirements for each source-destination pair, the invention can compute the optimal routing, scheduling and power control method and adapt it to the changing network conditions.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for scheduling communication in a wireless communications network, the network having a plurality of nodes, the method comprising steps of:
   measuring channel parameters between arbitrary nodes in the wireless communications network;
   for each possible transmission mode, identifying a signal to interference plus noise ratio based upon the measured channel parameters;
   mapping the signal to interference plus noise ratio into a data rate for the transmission modes;
   from a subset of transmission modes that result from the step of mapping, determining which of all of the transmission modes may be scheduled for one of to meet minimum data rate constraints between links and minimize total average power, or to maximize total throughput while meeting a maximum power constraint on each link in the network; and
   choosing path flows for routing communications through the links scheduled by said step of determining, and wherein said step of choosing paths comprises:
   determining an initial set of path flows between sources and destinations, and calculating a data rate carried on each link of the network to define a set of data rates;
   for the set data rates, minimizing total power and calculating a resulting link sensitivity of the total power to a change in the data rate on each link to define calculated link sensitivity parameters;
   using the calculated link sensitivity parameters to produce adjusted path flows;
   re-calculating the carried data rate on each link for adjusted path flows, and recalculating the link sensitivity parameters;
   iteratively repeating, if necessary, said steps of adjusting and re-calculating until total power used is acceptably small.

2. The method of claim 1, wherein said step of measuring measures channel parameters between all nodes in the wireless communication network.

3. The method of claim 1, wherein said step of measuring measures channel parameters between a subset of all of the nodes in the communication network, including nodes having no communication link at the time of measuring.

4. The method of claim 1, wherein said step of determining comprises:
   applying a linear program constrained by the minimum data rates between links and the transmitting power of nodes.

5. The method of claim 1, wherein said step of determining determines the links that define a transmission mode, and the duty cycle for each transmitting node in the transmission mode.

6. The method of claim 5, wherein a transmission mode determined in said step of determining further comprises a transmission power and data rate for each of the links.

7. The method of claim 1, applied in a hierarchal manner and carried out on a cluster of links, further comprising the steps of dividing a set of links into clusters, and carrying out said steps of measuring and determining for each cluster.

8. The method of claim 7, wherein inter-cluster interference is modeled as static ambient noise.

9. The method of claim 8, wherein interaction between clusters is modeled with a fixed-point equation that determines the level of inter-cluster interference.

10. The method of claim 1, carried out by a node in the network.

11. A method for scheduling communication in a wireless communications network, the network having a plurality of nodes, the method comprising steps of:
    measuring channel parameters between arbitrary nodes in the wireless communications network;
    for each possible transmission mode, identifying a signal to interference plus noise ratio based upon the measured channel parameters;
    mapping the signal to interference plus noise ratio into a data rate for the transmission modes; and
    from a subset of transmission modes that result from the step of mapping, determining which of all of the transmission modes may be scheduled for one of to meet minimum data rate constraints between links and minimize total average power, or to maximize total throughput while meeting a maximum power constraint on each link in the network;
    wherein said step of determining comprises application of a convex duality calculation;
    wherein the convex duality calculation comprises:
    defining a numerical value for each transmission mode in the subset of transmission modes, wherein the numerical value is the sum of powers for each link plus a difference term for each link, and wherein each difference term is equal to a difference between a required minimum data rate on the link and an associated data rate on the link for a given transmission mode, and wherein difference terms summed in the numerical value are weighted in proportion to corresponding dual variables defined for each link;
    restating a modified optimization criteria defined as the smallest numerical value from said step of defining, over the set of transmission modes in the subset of transmission modes;
    determining optimal values for the dual variables which maximize the modified optimization criteria;
    determining a set of transmission modes whose associated numerical values achieve the minimum in the modified optimization criteria, wherein the dual variables are set to optimal values as determined in said step of determining optimal values.

12. A method for scheduling communication in a wireless communications network, the network having a plurality of nodes, the method comprising steps of:
    measuring channel parameters between arbitrary nodes in the wireless communications network;

for each possible transmission mode, identifying a signal to interference plus noise ratio based upon the measured channel parameters;

mapping the signal to interference plus noise ratio into a data rate for the transmission modes;

from a subset of transmission modes that result from the step of mapping, determining which of all of the transmission modes may be scheduled for one of to meet minimum data rate constraints between links and minimize total average power, or to maximize total throughput while meeting a maximum power constraint on each link in the network;

specifying a traffic matrix wherein each element in the matrix comprises a rate of data traffic to be moved between a transmitting node and a receiving node;

testing a candidate routing using the traffic matrix to induce a data rate on each link;

scheduling according to said steps of measuring, identifying, mapping and determining to determine transmission power and link sensitivity parameters indicating sensitivity of total power to changes in data rate on each link;

iteratively searching for a routing to reduce average power.

13. The method of claim 12, wherein the value of link sensitivity parameters are determined by steps comprising:

defining a numerical value for each transmission mode in the subset of transmission modes, wherein the numerical value is the sum of powers for each link plus a difference term for each link, and wherein each difference term is equal to a difference between a required minimum data rate on the link and an associated data rate on the link for a given transmission mode, and wherein difference terms summed in the numerical value are weighted in proportion to a dual variable defined for each link;

restating a modified optimization criteria defined as the smallest numerical value from said step of defining over the set of transmission modes in the subset of transmission modes;

determining optimal values for the dual variables which maximize the modified optimization criteria;

determining a set of transmission modes whose associated numerical values achieve the minimum in the modified optimization criteria, wherein the dual variables are set to optimal values as determined in said step of determining a set of transmission modes, such that the sensitivity value for each link is equal to the optimal value of respective dual variable determined by said step of determining optimal values for the dual variables.

14. A method for routing information through a wireless communication network, the network having a plurality of nodes and a plurality of potential links between the nodes, the method comprising steps of:

determining a traffic matrix that specifies the rate of information transport between each pair of nodes in the network;

setting an initial routing of traffic on said links of the network in order to support the traffic matrix determined in said step of determining a traffic matrix;

determining required data rates on the links of the wireless communication network for the initial routing of traffic set in said step of setting;

computing a sensitivity of links in response to change of data rate;

iteratively adjusting the routing of traffic using the sensitivity of links so that the weighted sum of expended transmission powers across the links of the network is reduced and repeating said steps of determining and computing, wherein said step of computing computes a sensitivity parameter for all links in the network;

wherein the value of link sensitivity parameters are determined by steps comprising:

defining a numerical value for each transmission mode in the subset of transmission modes, wherein the numerical value is the sum of powers for each link plus a difference term for each link, and wherein each difference term is equal to a difference between a required minimum data rate on the link and an associated data rate on the link for a given transmission mode, and wherein difference terms summed in the numerical value are weighted in proportion to a dual variable defined for each link;

restating a modified optimization criteria defined as the smallest numerical value from said step of defining over the set of transmission modes in the subset of transmission modes;

determining optimal values for the dual variables which maximize the modified optimization criteria;

determining a set of transmission modes whose associated numerical values achieve the minimum in the modified optimization criteria, wherein the dual variables are set to optimal values as determined in said step of determining optimal values;

such that the sensitivity value for each link is equal to the optimal value of a respective dual variable determined by said step of determining optimal values for the dual variables.

15. The method of claim 14, wherein said step of iteratively adjusting and repeating is repeated until the weighted sum of expended transmission powers does not significantly change in response to adjusting the routing.

* * * * *

UNITED STATES PATENT AND TRADEMARK OFFICE
CERTIFICATE OF CORRECTION

PATENT NO. : 7,633,894 B2
APPLICATION NO. : 10/525696
DATED : December 15, 2009
INVENTOR(S) : Rene L. Cruz et al.

It is certified that error appears in the above-identified patent and that said Letters Patent is hereby corrected as shown below:

Col. 3, line 51  Please delete " set ϵ of $L_ϵ = |ϵ|$ " and insert -- set ϵ of $L_ϵ = |ϵ|$ -- therefor.

Col. 4, line 36  Please delete " $P_m(L_ϵ)$ " and insert -- $P_m(L_ϵ)$ -- therefor.

Col. 4, line 30  Please delete " $W^v \gamma m(t)$ " and insert -- $W^v \gamma m(l)$ -- therefor.

Col. 4, line 38  Please delete " ϵ(i) be the links in ϵ " and insert -- ϵ(i) be the links in ϵ -- therefor.

Col. 4, line 44  Please delete " $\sum_{i \in ϵ}(i)$ " and insert -- $\sum_{i \in ϵ}(i)$ -- therefor.

Col. 4, line 53  Please delete "$X_m$" and insert -- $X_m(l)$ -- therefor.

Col. 4, line 67  Please delete "≧" and insert -- ≥ -- therefor.

Col. 4, line 67  Please delete " $l \in ϵ$ " and insert -- $l \in ϵ$ -- therefor.

Col. 5, line 3  Please delete " $(L_ϵ)$ " and insert -- $(L_ϵ)$ -- therefor.

Col. 5, line 14  Please delete " $(L_ϵ)$ " and insert -- $(L_ϵ)$ -- therefor.

Col. 5, line 24  Please delete " $\sum_{i \in ϵ}$ " and insert -- $\sum_{l \in ϵ}$ -- therefor.

Col. 5, line 44  Please delete " $n_{R(L_ϵ)}$ " and insert -- $n_{R(L_ϵ)}$ -- therefor.

Col. 5, line 45  After "value of the" please delete the line break.

Col. 5, line 57  Please delete " $(L_ϵ)$ " and insert -- $(L_ϵ)$ -- therefor.

Signed and Sealed this

Thirty-first Day of August, 2010

David J. Kappos
*Director of the United States Patent and Trademark Office*

Col. 5, line 62  Please delete "$\sum_{i \in \varepsilon}$" and insert -- $\sum_{l \in \varepsilon}$ -- therefor.

Col. 6, line 22  Please delete "≧" and insert -- ≥ -- therefor.

Col. 6, line 47  Please delete "$\sum_{i \in \varepsilon(i)}$" and insert -- $\sum_{l \in \varepsilon(i)}$ -- therefor.

Col. 6, line 56  Please delete "$2^{L_\varepsilon}$" and insert -- $2^{L_\varepsilon}$ -- therefor.

Col. 6, line 61  Please delete "1≦m≦M" and insert -- 1≤m≤M -- therefor.

Col. 7, line 18  Please delete "≧" and insert -- ≥ -- therefor.

Col. 7, line 43  Please delete "$V(\vec{P}^{*,i}, \vec{C}, \vec{X}(\vec{P}^{*,i}))$" and insert -- $V(\vec{P}^{*,i}, \vec{C}, \vec{X}(\vec{P}^{*,i}))$ -- therefor.

Col. 7, line 54  Please delete "$(L_\varepsilon+1)$" and insert -- $(L_t+1)$ -- therefor.

Col. 7, line 55  Please delete "$(L_\varepsilon+1)$" and insert -- $(L_t+1)$ -- therefor.

Col. 7, line 57  Please delete "$(L_\varepsilon+1)$" and insert -- $(L_t+1)$ -- therefor.

Col. 7, line 60  Please delete "$(L_\varepsilon+1)$" and insert -- $(L_\varepsilon+1)$ -- therefor.

Col. 7, line 61  Please delete "$H(\vec{C_3}, \vec{n}) = g(\vec{\beta}^*) = \overline{V(\vec{P}^{*,i}_3 \vec{C_3}, \vec{X}(\vec{P}^{*,i}))}$" and insert -- $H(\vec{C}, \vec{n}) = g(\vec{\beta}^*) = \overline{V(\vec{P}^{*,i}, \vec{C}, \vec{X}(\vec{P}^{*,i}))}$ -- therefor.

Col. 7, line 62  Please delete "$1 \leq i \leq \hat{K}$" and insert -- $1 \leq i \leq \hat{K}$ -- therefor.

Col. 8, line 12  Please delete "$\sum_{i=1}^{\vec{K}} \lambda^*(i) X^{*,i}(l) = C(l)$" and insert -- $\sum_{i=1}^{\hat{K}} \lambda^*(i) X^{*,i}(l) = C(l)$ -- therefor.

Col. 8, line 15 Please delete "$\sum_{i=1}^{\vec{K}}$" and insert -- $\sum_{i=1}^{\hat{K}}$ -- therefor.

Col. 8, line 19 Please delete "$L_\epsilon$" and insert -- $L_\varepsilon$ -- therefor.

Col. 8, line 19 Please delete "≦" and insert -- ≤ -- therefor.

Col. 8, line 38 Please delete "$(L_\epsilon+1)$" and insert -- $(L_\varepsilon+1)$ -- therefor.

Col. 8, line 39 Please delete "$2^{L_\epsilon}$" and insert -- $2^{L_\varepsilon}$ -- therefor.

Col. 8, line 58 Please delete "modes" and insert -- mode -- therefor.
Col. 9, line 10 Please delete "edges $\epsilon$" and insert -- edges $\varepsilon$ -- therefor.

Col. 9, line 11 Please delete "$\epsilon(1), \epsilon(2), \ldots \epsilon(J)$" and insert -- $\varepsilon(1), \varepsilon(2), \ldots \varepsilon(J)$ -- therefor.

Col. 9, line 12 Please delete "$\epsilon = \cup_{j=1}^{J} \epsilon(j)$" and insert -- $\varepsilon = \cup_{j=1}^{J} \varepsilon(j)$ -- therefor.

Col. 9, line 51 Please delete "$L_{\epsilon(j)}))$" and insert -- $L_{\varepsilon(j)}))$ -- therefor.

Col. 9, line 56 Please delete "$(L_{\epsilon(k)}))$" and insert -- $(L_{\varepsilon(k)}))$ -- therefor.

Col. 10, line 10 Please delete "$\sum V_\epsilon L_{\epsilon(k)}$" and insert -- $\sum l' \epsilon L_{\varepsilon(k)}$ -- therefor.

Col. 10, line 25 Please delete "≧" and insert -- ≥ -- therefor.

Col. 10, line 38 Please delete "$(\vec{C}, \vec{N})$" and insert -- $(\vec{C}, \vec{N}^k)$ -- therefor.

Col. 11, line 27 Please delete "≦" and insert -- ≤ -- therefor.

Col. 11, line 59 Please delete "$X^{avg}(t) = \lim_{n \to +\infty} \frac{1}{n} \sum_{m=1}^{n_1} X_{ml}(t)$" and insert -- $X^{avg}(l) = \lim_{n \to \infty} \frac{1}{n} \sum_{m=1}^{n} X_m(l)$ -- therefor.

CERTIFICATE OF CORRECTION (continued)
U.S. Pat. No. 7,633,894 B2

Col. 11, line 61 Please delete "$= \lim_{n \to +\infty} \frac{1}{n} \sum_{m=1}^{n_l} W' \left[ \frac{G(T(l)_l R(l)) P_m(l)}{\sum_{k:k \neq l} G(T(k)_l R(l)) P_m(k) + n_{R(l)}(m)} \right]$"

and insert -- $= \lim_{n \to \infty} \frac{1}{n} \sum_{m=1}^{n} W' \left[ \frac{G(T(l),R(l))P_m(l)}{\sum_{k:k \neq l} G(T(k),R(l))P_m(k)+n_{R(l)}(m)} \right]$ -- therefor.

Col. 11, line 65 Please delete "$\lim_{n \to +\infty}$" and insert -- $\lim_{n \to \infty}$ -- therefor.

Col. 12, line 5 Please delete "$\sum_{m: \in S_n(i)} W' \left[ \frac{G(T(l)_l R(l)) P^{*,l^i}_j(l)}{\sum_{k:k \neq l} G(T(k)_2 R(l)) P^{*,l^i}_j(k) + n_{R(l)}(m)} \right]$" and insert -- $\sum_{m \in S_n(i)} W' \left[ \frac{G(T(l),R(l)) P^{*,i}_j(l)}{\sum_{k:k \neq l} G(T(k),R(l)) P^{*,i}_j(k) + n_{R(l)}(m)} \right]$ -- therefor.

Col. 12, line 10 Please delete "$\geq \sum_i \lambda^*(i) W' \left[ \frac{G(T(l)_l R(l)) P^{*,l^i}_j(l)}{\sum_{k:k \neq l} G(T(k)_2 R(l)) P^{*,l^i}_j(k) + N^*_j(l)} \right]$" and insert -- $\geq \sum_i \lambda^*(i) W' \left[ \frac{G(T(l),R(l)) P^{*,i}_j(l)}{\sum_{k:k \neq l} G(T(k),R(l)) P^{*,i}_j(k) + N^*_j(l)} \right]$ -- therefor.

Col. 12, line 12 Please delete "$C(l)_2$" and insert -- $C(l)$, -- therefor.
Col. 12, line 31 Please delete "insure" and insert -- ensure -- therefor.
Col. 12, line 38 Please delete "considered a above" and insert -- considered above -- therefor.

Col. 13, line 9 Please delete "$L_\epsilon$" and insert -- $L_\epsilon$ -- therefor.

Col. 13, line 12 Please delete "$\epsilon$" and insert -- $\in$ -- therefor.

Col. 13, line 15 Please delete "$\epsilon$" and insert -- $\in$ -- therefor.

Col. 13, line 31 Please delete "$\epsilon$" and insert -- $\in$ -- therefor.

Col. 14, line 64 Please delete "X, Y and Y" and insert -- X, Y and Z -- therefor.
Col. 15, line 39 Please delete "by the our" and insert -- by our -- therefor.

CERTIFICATE OF CORRECTION (continued)
U.S. Pat. No. 7,633,894 B2

Col. 16, lines 41-42
Please delete "for these polices in Fig. 8" and insert
-- for these Fig. 8 policies -- therefor.

Col. 18, line 42 Please delete both instances of "$\sum_{i \in \epsilon\varepsilon}$" and insert -- $\sum_{l\epsilon\varepsilon}$ -- therefor.

Col. 18, line 52 Please delete "$\geqq$" and insert -- $\geq$ -- therefor.

Col. 18, line 53 Please delete "$\geqq$" and insert -- $\geq$ -- therefor.

Col. 18, line 54 Please delete " $l\in\epsilon$ " and insert -- $l\in\varepsilon$ -- therefor.